US006232128B1

(12) United States Patent
Iguchi et al.

(10) Patent No.: US 6,232,128 B1
(45) Date of Patent: May 15, 2001

(54) PACKAGE FOR CONTAINER OF LIQUID MEDICINE CONTAINING BICARBONATE AND PH INDICATOR

(75) Inventors: Seiichiro Iguchi; Shino Shinomiya, both of Naruto; Rika Hamamoto, Itano-gun; Akiyo Abe, Naruto; Masatoshi Inai; Keiichi Kawakami, both of Itano-gun, all of (JP)

(73) Assignee: Otsuka Pharmaceutical Factory, Inc., Tokushima (JP)

( * ) Notice: Subject to any disclaimer, the term of this patent is extended or adjusted under 35 U.S.C. 154(b) by 0 days.

(21) Appl. No.: 09/202,497

(22) PCT Filed: Jun. 13, 1997

(86) PCT No.: PCT/JP97/02040

§ 371 Date: Dec. 16, 1998

§ 102(e) Date: Dec. 16, 1998

(87) PCT Pub. No.: WO97/48365

PCT Pub. Date: Dec. 24, 1997

(30) Foreign Application Priority Data

Jun. 17, 1996 (JP) .... 8-155308
Apr. 28, 1997 (JP) .... 9-110591

(51) Int. Cl.[7] .... G01N 21/77

(52) U.S. Cl. .... 436/163; 436/1; 436/165; 436/166; 422/61

(58) Field of Search .... 422/58, 61; 436/133, 436/1, 16, 3, 165, 166–167

(56) References Cited

U.S. PATENT DOCUMENTS

| | | | | |
|---|---|---|---|---|
| 5,096,813 | * | 3/1992 | Krumhar et al. | 422/58 |
| 5,179,002 | * | 1/1993 | Fehder | 422/56 |
| 5,183,742 | * | 2/1993 | Omoto et al. | 436/86 |
| 5,252,484 | * | 10/1993 | Matner et al. | 422/58 |

FOREIGN PATENT DOCUMENTS

| | | |
|---|---|---|
| 3-267741 | 11/1991 | (JP) . |
| 8-164185 | 6/1996 | (JP) . |

* cited by examiner

*Primary Examiner*—Lyle A. Alexander
(74) *Attorney, Agent, or Firm*—Sughrue, Mion, Zinn, Macpeak & Seas, PLLC

(57) ABSTRACT

The invention relates to a bicarbonate-containing medical solution package. The package comprises a gas-permeable plastic container holding a bicarbonate-containing medical solution and a gas-impermeable plastic packaging member containing the gas-permeable plastic container. A carbon-dioxide atmosphere is established in the space between the container and packaging member. In addition, a pH indicating device is contained within the space between the container and packaging member. The pH indicating device is a gas-permeable plastic packet containing a bicarbonate-containing fluid (similar to the medical solution) and a pH indicator. The pH indicator undergoes a change in color in response to a change in pH of the fluid. Use of this package allows the easy monitoring of a change in pH and consequent aging of the medical solution due to prolonged storage or damage to the outer packaging member.

10 Claims, 2 Drawing Sheets

PACKAGE FOR CONTAINER OF LIQUID MEDICINE CONTAINING BICARBONATE AND PH INDICATOR

TECHNICAL FIELD

The present invention relates to a bicarbonate-containing medical solution package and more particularly to an improved bicarbonate-containing medical solution package equipped with an indicating device adapted to alert the user to expiration of a medical aqueous solution containing sodium bicarbonate or the like through a change in color.

PRIOR ART

The medical bicarbonate solution, that is a medical aqueous solution containing bicarbonate ions, is broadly in use in such applications as an antidote, an artificial kidney dialysate, a peritoneal dialysate, an infusion, a root canal enlarging agent (for dental use), an artificial cerebrospinal fluid, an intraocular irrigating solution, a cardiac perfusate, a cardioplegic solution, a peritoneal irrigating solution, a solution for organ preservation, etc. In such a medical aqueous solution, bicarbonate ions are in equilibrium as represented by the following expression (1):

$$2HCO_3^- \rightleftarrows CO_2\uparrow + CO_3^{2-} + H_2O$$

In an open system, the reaction proceeds to the right as the carbon dioxide gas on the right-hand side of the expression is dissipated, with the result that the bicarbonate ion is decreased and the carbonate ion is increased. As a result, the pH of the aqueous solution rises progressively.

This change with time detracts a great deal from the utility value of the aqueous solution because one of the primary objectives of using such a medical solution is the maintenance or correction of the acid-base balance. Particularly, it is known that injection of the solution with an increased carbonate ion concentration causes necrosis of the subcutaneous tissue [Howland, J. and Marriot, W. M., Am. J. Dis. Child., 11, 309 (1916)] and to avoid this hazard, the carbonate ion concentration of solutions is generally controlled, with Japanese Pharmacopoeia XIII restricting it to the range of 7.9–8.6 and USP 23 to the range of 7.0–8.5.

Furthermore, to prevent aging, aqueous solutions for medical use are conventionally packed in gas-tight containers such as glass ampules or stoppered bottles for preventing evaporation of evolved carbon dioxide gas to thereby maintain the equilibrium essential to the stabilization of bicarbonate ion concentration and solution pH.

However any glass container has the serious disadvantage that it is broken by a slight impact, does not lend itself well to capacity increase, is very heavy, and involves difficulties in disposal. In addition, since the evolution of carbon dioxide gas in the course of sterilization or pasteurization of a medical aqueous solution is unavoidable, the risk for an elevation of internal pressure inducing breakage of the glass container is high.

To overcome the above breakage and other troubles associated with glass containers and provide containers of reduced weight and easier to dispose of, much research has been undertaken in the field of plastic containers in recent years and, for medical use, too, containers made of polyethylene, ethylene-vinyl acetate copolymer, polypropylene, polyvinyl chloride, or the like have been developed. However, as used independently, plastic containers invariably have the disadvantage that the gas permeability of the plastic material itself is so high that when such a container is filled with a bicarbonate ion-containing aqueous solution for medical use, the carbon dioxide gas evolved escapes through the container wall into the atmosphere with the progress of time to inevitably cause an elevation of the solution pH. Therefore, even the use of such a plastic container is still inadequate for obviating the above-mentioned disadvantages associated with aging of the solution. The above-mentioned problems due to dissipation of carbon dioxide gas and consequent rising in pH of the solution are encountered in the sterilization step as well.

As a technology for overcoming the above-mentioned disadvantages of plastic containers, it has been proposed to enshroud a direct container in a gas-impermeable secondary container (outer container or packaging material) and establish a carbon dioxide atmosphere in the space between the two containers [e.g. Japanese Unexamined Patent Publication Nos. 49675/1993, 261141/1993, and 339512/1994].

However, even this double packaging technology is not effective enough to eliminate the gradual loss of carbon dioxide gas due to the incidence of the so-called pinhole in the secondary packaging material or mere prolongation of the storage period and the aqueous solution which has undergone such a time-dependent elevation of pH should be discarded promptly to avoid the above-mentioned risk due to inadvertent administration to a patient.

Regarding the detection of an abnormal pH change of such a double-packaged bicarbonate-containing medical solution, much research has been undertaken and it has been proposed to dispose an oxygen absorber, such as Ageless™ (manufactured by Mitsubishi Gas Chemical Co.), and an oxygen sensor, such as Ageless Eye™ (manufactured by Mitsubishi Gas Chemical Co.), within the secondary package to create an anoxic state and detect the infiltration of atmospheric oxygen in the event of formation of a pinhole. However, this technology does not provide for a direct indication of a pH change but merely senses the infiltration of atmospheric oxygen from a pinhole. In addition, the above-mentioned oxygen absorber and oxygen sensor have the drawback that it requires a special handling procedure for avoiding exposure to oxygen during storage as well as in the packaging operation. Therefore, the advent of a technology that would lend itself well to commercial production and provide for an accurate and timely detection of pH change has been demanded by the industry.

The present invention, therefore, has for its object to overcome all the above-mentioned disadvantages of the prior art and thereby provide a novel medical solution package which is capable of holding a bicarbonate-containing medical solution in stable condition in a plastic container and providing an unmistakable visual indication of pH change due to evolution of carbon dioxide gas.

After intensive studies with the above object in mind, the inventors of the present invention discovered that a novel medical solution package meeting the above object can be provided by the technology of the invention which comprises a step of dispensing a bicarbonate-containing medical solution in a gas-permeable plastic container and sterilizing it by the routine autoclaving, hot-water immersion, or hot-water shower method or, as a alternative, dispensing a bicarbonate-containing medical solution in a plastic container by the aseptic process, a step of packaging the filled container in a gas-impermeable plastic secondary packaging member, a step of establishing a carbon dioxide atmosphere in the space between said container and said secondary packaging member, and a step of disposing a pH indicating device comprising a gas-permeable plastic packet containing a bicarbonate-containing fluid and a specific pH-indicator within said space. The present invention has been developed on the basis of the above finding.

DISCLOSURE OF THE INVENTION

Thus the present invention provides a bicarbonate-containing medical solution package comprising a gas-permeable plastic container filled with a bicarbonate-containing medical solution and a gas-impermeable plastic packaging member enclosing said gas-permeable plastic container, with a carbon dioxide atmosphere having been established in a space between said container and said packaging material, and, as disposed in said space, a pH indicating device comprising a gas-permeable plastic packet containing a bicarbonate-containing fluid and a pH-indicator which undergoes a change in color in response to a change in pH of said fluid.

More particularly, the present invention provides the above-mentioned package wherein said pH-indicator is a substance selected from among cresol red, m-cresol purple, and phenol red, the above-mentioned package wherein the pH-indicator is available in a concentration of 10–2000 ppm, the above-mentioned package wherein the bicarbonate concentration of the fluid within the pH indicating device is 0.05–2.0 w/v %, the above-mentioned package wherein the bicarbonate is sodium bicarbonate, and the above-mentioned package wherein the carbon dioxide atmosphere is established by inclusion of a $CO_2$-generating oxygen absorber or enclosure of a $CO_2$-containing mixed gas.

Having the above-described construction, the package of the present invention offers the following and other advantages. Thanks to the utilization of a plastic container, it is not easily breakable, adaptable for increased capacity, and reduced in weight; because of the use of a gas-impermeable secondary packaging member and establishment of a carbon dioxide atmosphere in the space between said container and packaging member, dissipation of the carbon dioxide gas released from the medical solution and the associated change in solution pH can be prevented; the pH change and associated aging of the medical solution upon prolonged storage or due to formation of a pinhole in the secondary packaging member can be easily detected by the naked eye; and the objective package can be easily fabricated by the conventional manufacturing technology. Particularly in the present invention wherein a bicarbonate-containing solution is used as an internal fluid of the pH indicating device, the pH of this internal fluid also changes in proportion with the change in pH of the medical solution in response to the carbon dioxide concentration ($CO_2$ partial pressure) within the space. Therefore, by using a pH-indicator capable of sensing a pH change of the internal fluid, the pH change of the medical solution can be visualized as the change in color of said pH-indicator.

The medical solution package of the present invention is now described in detail. For use in the present invention, the bicarbonate-containing medical solution may be any of aqueous solutions of a bicarbonate such as sodium bicarbonate, ammonium bicarbonate, potassium bicarbonate, or the like, aqueous solutions containing such a salt or salts as well as other components and giving rise to bicarbonate ions, and aqueous solutions of a carbonate, such as sodium carbonate, potassium carbonate, or the like, which give rise to carbonate ions (even if a carbonate is added, it is converted to the corresponding bicarbonate at the application pH). The bicarbonate ion concentration of such aqueous solutions need not be so critically controlled but is generally within the range of about 0.01–1 M, which corresponds to about 0.01–10% in terms of the concentration of aqueous bicarbonate solutions. The particularly preferred bicarbonate concentration is about 0.1–8.5%.

The composition of said bicarbonate-containing medical solution is not restricted but can be judiciously selected according to the intended use of the solution. Thus, it may be identical in composition to an antidote, an artificial kidney dialysate, a peritoneal dialysate, an infusion, a root canal enlarging agent (for dental use), an artificial cerebrospinal fluid, an intraocular irrigating solution, a cardiac perfusate, a cardioplegic solution, a peritoneal irrigating solution, a solution for organ preservation, or the like or of a somewhat modified composition.

One of a typical bicarbonate-containing medical solution contains electrolyte ions and reducing sugar within the following formulation range, and may additionally contain phosphate ions and trace metal ions such as copper and zinc ions.

| | | |
|---|---|---|
| Sodium ion | 120–170 | mEq/l |
| Potassium ion | 0–10 | mEq/l |
| Calcium ion | 2–5 | mEq/l |
| Magnesium ion | 0–3 | mEq/l |
| Chloride ion | 100–150 | mEq/l |
| Bicarbonate ion | 15–40 | mEq/l |
| Reducing sugar | 0–10 | w/v % |

As the gas-permeable plastic container to be filled with said medical solution, various containers which are conventionally used in the medical field can be employed. Thus, for example, containers made of polyethylene, ethylene-vinyl acetate copolymer, polypropylene, polyvinyl chloride, or the like and those made of two or more suitable mixtures of such resins or their laminates. There is no particular limitation on the shape and size of such containers but rectangular and cylindrical forms are generally preferred and their capacities are generally within the range of about 20 ml to about 3 litters. Such containers are used with advantage in the present invention.

The above-mentioned container may be a gas-permeable plastic bag comprising at least two intercommunicable compartments isolated from one another by a divider. Bags of this type are known. For example, a bag equipped with a closure means for preventing intercommunication of two compartments (e.g. Japanese Examined Patent Publication No. 20550/1988, Japanese Examined Utility Model Publication No. 17474/1988) and a bag whose compartments can be simply brought into intercommunication by pressing (e.g. Japanese Unexamined Patent Publication Nos. 309263/1988 and 4671/1990). In such a bag, the bicarbonate-containing medical solution may be contained in at least one of the compartments.

The term "gas-impermeable" as used in describing the gas-impermeable packaging member for use in the invention does not mean that the particular material is strictly impermeable to gases, but is a relative term meaning that it is less permeable to gases than is the above-mentioned container for a medical solution. Thus, even if the secondary packaging member is made of the same material as that of the direct container for a medical solution, it can be used as the gas-impermeable packaging material only provided it is sufficiently thick. The material that can be used for the gas-impermeable packaging member includes all of those raw materials which are conventionally used in the fabrication of packaging materials of this kind, such as polyethylene terephthalate (PET), polyethylene naphthalate (PEN), polyvinyl alcohol (PVA), ethylene-vinyl alcohol copolymer (EVOH), polyvinylidene chloride (PVDC), and nylon, such plastic materials carrying a vapor-deposition layer of inorganic material such as silicon oxide, aluminum oxide, etc. on the surface, and multi-layer composite materials (laminates) made up of such materials. There is no particular limitation on the shape and size of such packaging materials only provided said plastic container can be suitably accommodated therein. However, it is necessary that, in shaped and size, such a packaging member should provide for a sufficient space for accepting a carbon dioxide-containing gas after packaging and generally speaking it is preferably so large as to provide for a volume equal to about 1.2–3 times the capacity of said plastic container.

Referring to the technology for establishing a carbon dioxide atmosphere in the space between said container and packaging member, a typical process comprises inspiriting a mixed gas, such as a mixture of $CO_2$ gas and air or a mixture of $CO_2$ gas and nitrogen gas, in said space. The carbon dioxide concentration of the mixed gas used in this process is selected according to the kind of medical solution to be contained in the plastic container, particularly its bicarbonate ion concentration and pH. Assuming, for instance, that said medical solution is an aqueous solution prepared by dissolving 70 g of sodium bicarbonate in sufficient water for injection to make 1 litter, the bicarbonate ion concentration of this aqueous solution is 833 mM and the pH of the solution is 8.2. To maintain these values, the carbon dioxide concentration of the mixed gas atmosphere is preferably set to about 40%.

The bicarbonate ion concentration and pH of the medical solution for use in the present invention are generally about 0.01–1 M and pH about 6.5–8.6, respectively. Preferably the carbon dioxide partial pressure in said space is generally controlled at about 1 mmHg–760 mmHg and it is preferable to select the percentage of carbon dioxide in said mixed gas accordingly. More particularly, when the pH of the medical solution immediately after preparation is within the predetermined range, the carbon dioxide gas to be enclosed in the space can be such that its partial pressure will be substantially equal to the carbon dioxide partial pressure of the medical solution.

An alternative method for establishing a carbon dioxide atmosphere in the space defined by said container and packaging member comprises enclosing a $CO_2$-generating oxygen absorber adapted to absorb the oxygen gas in the space and release a predetermined proportion, by volume, of carbon dioxide. As examples of such $CO_2$-generating oxygen absorber, there can be mentioned Ageless G and Ageless GM, both manufactured by Mitsubishi Gas Chemical Co., and Keep Fresh Type C manufactured by Toppan Printing Co., Ltd.

The procedures for filling the container with the medical solution, sterilization, packaging with the secondary packaging member, and establishment of a carbon. dioxide atmosphere within said space can all be easily carried out in accordance with the routine production protocol for injectable products.

It is one of the essential features of the present invention that a pH indicating device comprising a gas-permeable plastic packet enclosing a bicarbonate-containing solution and a pH-indicator designed to undergo a change in color in response to a pH change of said solution is enclosed in the space within the bicarbonate ion-containing medical solution package obtained as above. Here, only if the bicarbonate is contained, there is no particular limitation on the concentration and composition of the internal fluid of the pH indicating device but its bicarbonate concentration is preferably selected usually from the range of 0.05–2.0 w/v %.

The pH-indicator to be incorporated in the above internal fluid of the pH indicating device can be selected from among a variety of acid-base indicators which are capable of indicating a pH change of the device internal fluid as a color change. Preferred is an indicator which undergoes a change in color with high sensitivity in the pH region of said device internal fluid at the equilibrium carbon dioxide gas fraction in said space which corresponds to the critical pH of the medical solution (the upper limit value according to JP for the product). Generally, the critical pH of-a medical solution is on the alkaline side as mentioned above (.for example, the specification upper limit for a 7% aqueous solution of sodium bicarbonate is pH 8.6 according to JP XIII and the corresponding carbon dioxide gas fraction is about 19%). The pH of the indicating device internal fluid which is proportional to the pH of the medical solution is also on the alkaline side (e.g. the pH of a 0.28% aqueous solution of sodium bicarbonate is 7.0). Therefore, the above-mentioned pH-indicator is preferably a compound which undergoes a change in color on the weakly alkaline side.

The particularly preferred pH-indicator is one selected from among those substances having the following characteristics, viz. (1) a narrow color change interval, (2) a high intensity of color, (3) a favorable direction of color change (from an inconspicuous color to a conspicuous color), (4) high hygienicity (the substance should be highly safe and not migratory), (5) high stability, with the initial color change property being sustained for an extended time. As substances having such characteristics, there can be mentioned neutral red, aurin, phenol red, o-cresol red, α-naphtholphthalein, m-cresol purple, orange I, phenolphthalein, etc. Among them, the more preferred are phenol red (change from yellow to red at pH 6.8 through 8.4), o-cresol red (change from yellow to red at pH 7.2 through 8.8), and m-cresol purple (change from yellow to purple at pH 7.6 through 9.2).

The concentration of said pH-indicator should only be such that its change of color can be easily recognized by the naked eye and is preferably selected, for example, from the range of about 10–2000 ppm according to the size of the packet (thickness of the fluid layer) in which it is enclosed together with the internal fluid.

The packet containing said internal fluid and pH-indicator can be manufactured by the routine manufacturing technology and the raw material for this gas-permeable plastic packet may be at least equivalent to the medical solution container described hereinbefore in gas permeability. For example, said packet can be fabricated in a continuous series of forming, filling, and sealing by means of a vertical 3-side sealer, a vertical pillow packaging machine, or a rotary packer. When this manufacturing method is employed, the raw material for the packet is preferably a laminated film in consideration of machine processability and particularly when a polyethylene container is used as the medical solution container, a polypropylene (outer layer)-polyethylene (inner layer) laminate or a poly-4-methyl-1-pentene (outer layer)-polyethylene (inner layer) laminate is preferred.

Regarding the size of said packet and the volume of said internal fluid, it should be noted that if the quantity of the internal fluid enclosed in the packet is too small, the thickness of the indicating device fluid layer will be insufficient to make a visual assessment of the color change difficult. Therefore, the packet size and internal fluid volume should be selected in consideration of the geometric relation of the medical solution container and the secondary packaging member as well as the ease of recognition of the color change.

The indicating device thus prepared tends to develop turbidity owing to growth of bacteria in the internal fluid upon prolonged storage and to prevent or control this clouding problem, it can be sterilized by autoclaving. As an alternative, an antiseptic such as benzalkonium chloride, chlorhexidine gluconate, or the like, an antibacterial agent such as nalidixic acid, norfloxacin, etc., and/or a preservative such as p-hydroxybenzoic esters, benzyl alcohol, or the like may be incorporated.

Disposition of the packet in said space can be carried out simply by packaging the medical solution container and the packet together in the secondary packaging material and the disposing position is not critical inasmuch as the packet may be visually recognized from outside the package. In this manner, there can be provided an improved medical solution package permitting a visual inspection of the pH change of the medical solution in accordance with the present invention.

One preferred example of the medical solution package of the invention is illustrated in FIG. 1. This package comprises a gas-permeable plastic container 2 holding a bicarbonate-containing medical solution (drug solution, 1), a gas-impermeable packaging member 3 enclosing said container, and, as disposed in a space 4 defined by said container and packaging member, a packet (pH indicating device) 5 containing a bicarbonate-containing fluid and a pH-indicator, with a carbon dioxide gas atmosphere having been established within said space. Thanks to the above construction, a visual assessment of the pH change of the medical solution, which is the object of the invention, is made feasible with the accompanying merits mentioned hereinbefore.

Figure 1:
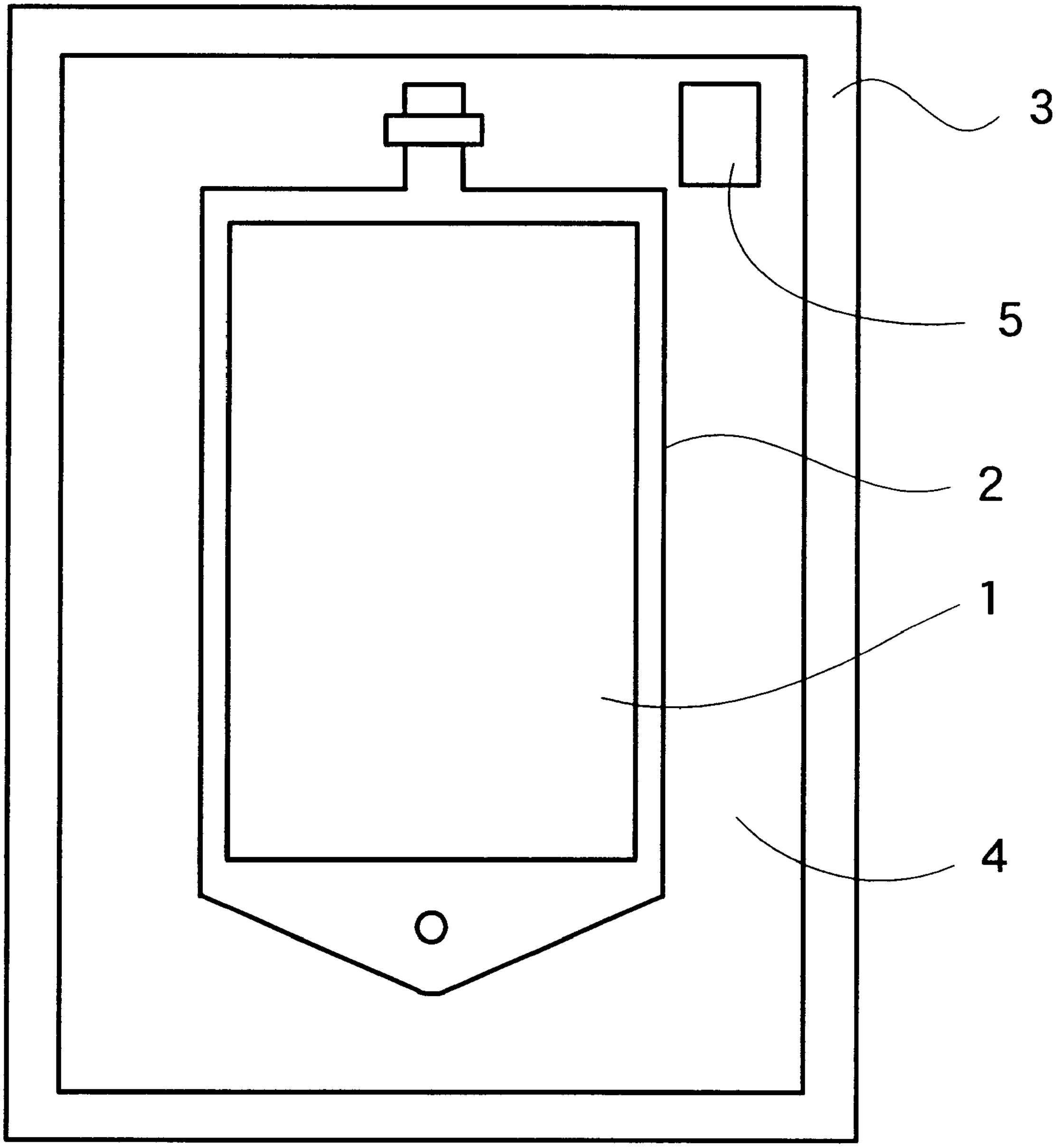
FIG. 1 is a schematic view illustrating a medical solution package according to one embodiment of the invention and FIG. 2 is a diagrammatic representation of the pH-carbon dioxide fraction equilibrium curves of the medical solution and pH indicating device internal fluid within the medical solution package of the invention.

In the above view and diagram, the reference numeral 1 stands for a medical solution, 2 for a gas-permeable plastic container, 3 for a gas-impermeable plastic packaging material, 4 for a space between said container 2 and packaging material 3, and 5 for a gas-permeable plastic packet (pH indicating device).

EXAMPLES

The following pH indicating device production examples and the medical solution package examples are intended to describe the present invention in further detail.

Production Example 1

In a 0.28% aqueous solution of sodium bicarbonate was dissolved 10 mg of phenol red to make 500 ml (20. w/v ppm). Using a vertical 3-side sealer, a 0.5 ml portion of the above solution was packaged with a polypropylene (outer layer, 20 μm thick)-polyethylene (inner layer, 30 μm thick) laminated film to provide a pH indicating device, 30 mm by 15 mm (inside dimensions). This indicating device, freshly prepared, was red-purple (color already developed).

Production Example 2

In a 0.28% aqueous solution of sodium bicarbonate was dissolved 10 mg of cresol red to make 500 ml (20 w/v ppm). A 0.5 ml portion of this solution was packaged with a polyethylene film (manufactured by Mitsui Petrochemical; 250 μm thick) to provide a pH indicating device, 40 mm by 20 mm (inside dimensions). Freshly prepared, this indicating device was purple (color already developed).

Production Example 3

In a 0.28% aqueous solution of sodium bicarbonate was dissolved 10 mg of m-cresol purple to make 500 ml (20 w/v ppm). Using a vertical 3-side sealer, a 0.5 ml portion of the above solution was packaged with a polypropylene (outer layer, 20 μm thick)-polyethylene (inner layer, 30 μm thick) laminated film to provide a pH indicating device, 30 mm by 15 mm (inside dimensions). Freshly prepared, this indicating device was purple (color already developed).

Production Example 4

In a 0.28% aqueous solution of sodium bicarbonate was dissolved 1 g of m-cresol purple to make 50 l (20 w/v ppm). Using Bottlepack 305 (manufactured by Rommelag), forming of a low-density polyethylene packet, filling of a portion-of the above solution, and sealing were continuously carried out to provide a pH indicating device, about 20 mm by about 10 mm and about 0.4 mm in wall thickness (fluid volume: about 0.4 ml).

Production Example 5

In a 0.28% aqueous solution of sodium bicarbonate was dissolved 1 g of m-cresol purple to make 50 l (20 w/v ppm). Using a vertical 3-side sealer, a 1 ml portion of the solution was packaged with an oriented polypropylene (outer layer, 30 μm thick)-linear low-density polyethylene (inner layer, 60 μm thick) laminated film to provide a pH indicating device having an external size of 40 mm by 20 mm and an internal size of 30 mm by 12 mm. Until use, this indicating device was stored as packed together with a mixed gas of 10% $CO_2$-90% air in a bag made of nylon (15 μm thick)-polyvinyl alcohol (18 μm thick)-low-density polyethylene (60 μm thick) laminated film.

Production Example 6

Using a poly-4-methyl-1-pentene (outer layer, 30 μm thick)-polyethylene (inner layer, 60 μm thick) laminated film for packaging, the procedure of Production Example 5 was otherwise repeated to provide a pH indicating device. Because of the high heat resistance of poly-4-methyl-1-pentene, this product showed improved high-speed sealability for increased productivity. Until use, this pH indicating device was stored together with a mixed gas of 10% $CO_2$-90% air in a bag made of nylon (15 μm thick)-polyvinyl alcohol (18 μm thick)-low density polyethylene (60 μm thick) laminated film.

Example 1

A 7% sodium bicarbonate injection aseptically filled in a 20 ml plastic ampule (mean thickness: 0.6 mm) made of low-density polyethylene (B-128H, Ube Industries) and adjusted to pH 8.3 was packed together with the pH indicating device according to Production Example 1 and a mixed gas of 40% $CO_2$-60% air in a blister package (space volume 40 ml) consisting of a bottom sheet molded from a polypropylene (200 μm)-EVOH (ethylene-vinyl alcohol copolymer) (100 μm)-polypropylene (200 μm) laminated sheet and a cover made of PET (12 μm)-polyvinyl alcohol (14 μm)-special grade polypropylene (40 μm) laminated film to provide a medical solution package according to the invention.

Figure 2:
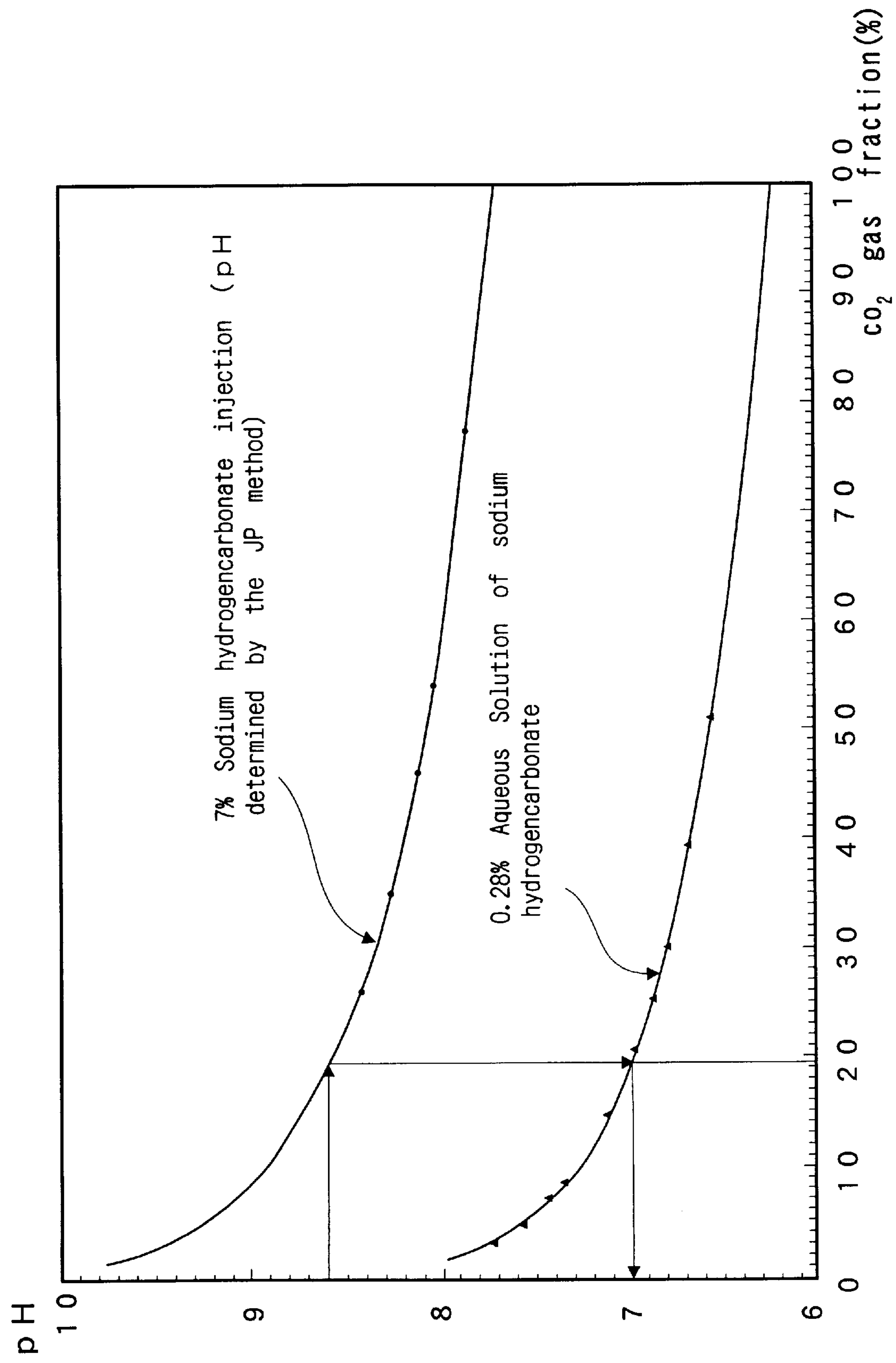

The indicating device was initially red-purple but had turned yellow (normal color) by 50 minutes later. The relation of the pH and carbon dioxide gas fraction (%) of the medical solution in the above package and the relation of the pH and carbon dioxide gas fraction of the internal fluid of the indicating device are shown in FIG. 2.

It is clear from this diagram that the carbon dioxide fraction of the medical solution at the specification upper limit for pH (pH 8.6) is about 19% and that the pH of the internal fluid of the pH indicating device at the above carbon dioxide fraction is 7.0, which is approximately equal to the color change region of 6.8–8.4 of phenol red used as the pH-indicator.

Using an injection needle (27G, Terumo, Neolus), a pinhole (about 500 μm in major diameter and about 50 μm in minor diameter) was pierced in the secondary packaging member of the above medical solution package of the invention and the change in color was monitored.

After 25 hours the indicating device was red-purple, and at this point of time, the carbon dioxide gas fraction within the secondary package was 1.22% and the pH of the medical solution was 8.57 (the carbon dioxide gas fraction within the ampule was 23.0%).

It has been found that the pH of such a medical solution then exceeds 8.6 (deviation from the specification) within a short time and this indicating device is useful for the prevention of use of an expired medical solution after its pH has deviated from the specification range due to formation of a pinhole in the secondary packaging member of the product.

Example 2

A 7% sodium bicarbonate injection aseptically filled in a 20 ml plastic ampule (mean thickness: 0.6 mm) made of low-density polyethylene (B-128H, Ube Industries) and adjusted to pH 8.3 was packed together with the indicating device according to Production Example 2 and a mixed gas of 40% $CO_2$-60% air in a bag of nylon (15 μm thick)-polyvinyl alcohol (18 μm thick)-polyethylene (60 μm thick) laminated film (space volume: 40 ml) to provide a medical solution package according to the invention.

The above indicating device was initially purple in color but had turned yellow (normal color) by 40 minutes later.

Using an injection needle (27G, Terumo, Neolus), a pinhole (about 500 μm in major diameter and about 50 μm in minor diameter) was pierced through the secondary packaging member of the above medical solution package of the invention and the change in color was monitored.

After 23 hours the indicating device was purple in color and, at this point of time, the carbon dioxide gas fraction within the secondary package was 1.55% and the pH of the medical solution was 8.55 (the carbon dioxide gas fraction within the ampule was 23.0%).

Example 3

A 7% sodium bicarbonate injection aseptically filled in a 20 ml plastic ampule (mean thickness: 0.6 mm) made of low-density polyethylene (B-128H, Ube Industries) and adjusted to pH 8.3 was packed together with the pH indicating device according to Production Example 3 and a mixed gas of 40% $CO_2$-60% air in a bag of nylon (15 μm thick)-polyvinyl alcohol (18 μm thick)-polyethylene (60 μm thick) laminated film (space volume 40 ml) to provide a medical solution package according to the invention.

This indicating device was initially purple in color but had turned yellow (normal color) by 50 minutes later.

Using an injection needle (27G, Terumo, Neolus), a pinhole (about 500 μm in major diameter and about 50 μm in minor diameter) was pierced through the secondary packaging member of the above medical solution package of the invention and the change in color was monitored.

After 32 hours the indicating device was purple and, at this point of time, the carbon dioxide gas fraction within the secondary package was 0.79% and the pH of the medical solution was 8.55 (the carbon dioxide gas fraction within the ampule was 24.2%).

Example 4

Five-hundred (500) milliliters of the following medical solution (Table 1) in a medical bag made of polyethylene (mean thickness: 250 μm) was sterilized by autoclaving (pH after sterilization: 7.30) and packed together with the indicating device according to Production Example 3 and a mixed gas of 6% $CO_2$gas-94% air in a bag made of nylon (15 μm thick)-polyvinyl alcohol (12 μm thick)-LLDPE (40 μm) laminated film to provide a medical solution package according to the invention.

TABLE 1

| Bicarbonate-containing medical solution | (/ml) |
|---|---|
| Sodium bicarbonate | 1.94 mg |
| Sodium chloride | 7.24 mg |
| Potassium chloride | 0.05 mg |
| Calcium chloride (dihydrate) | 0.17 mg |
| Magnesium chloride (hexahydrate) | 0.23 mg |
| Glucose | 0.6 mg |
| Potassium dihydrogen phosphate | 0.15 mg |
| Citric acid (additive) | 0.32 mg |

The indicating device disposed in the package of the invention, thus produced, was initially purple in color but had turned yellow after 6 hours.

Using an injection needle (27G, Terumo, Neolus), a pinhole (about 500 μm in major diameter and about 50 μm in minor diameter) was pierced through the secondary packaging member of the above medical solution package of the invention and the change in color was monitored.

After 103 hours the indicating device was purple, and at this point of time, the carbon dioxide gas fraction within the secondary package was 1.26% and the pH of the medical solution was 7.50.

Example 5

Five-hundred (500) milliliters of the medical solution (Table 1) in a medical bag (mean thickness: 250 μm) made of low-density polyethylene was sterilized by autoclaving (pH after sterilization: 7.30) and packed together with one piece each of the pH indicating device according to Production Example 3 and a oxygen absorber (Ageless GM-100 manufactured by Mitsubishi Gas Chemical) in a bag made of nylon (15 μm thick)-polyvinyl alcohol (14 μm)-LLDPE (40 μm thick) laminated film to provide a medical solution package according to the invention.

This pH indicating device was initially purple in color but had turned yellow by 24 hours later.

Using an injection needle (27G, Terumo, Neolus), a pinhole (about 500 μm in major diameter and about 50 μm in minor diameter) was pierced through the secondary packaging member of the above medical solution package of the invention and the change in color was monitored.

After 10 hours, the indicating device was purple and at this point of time the carbon dioxide gas fraction within the secondary package was 1.36% and the pH of the medical solution was 7.45.

Example 6

A sodium bicarbonate injection aseptically filled in a 20 ml plastic ampule (mean thickness 0.6 mm) made of low-density polyethylene (B-128H, Ube Industries) and adjusted to pH 8.3 was packed together with the indicating device according to Production Example 2 and a mixed gas of 40% $CO_2$-60% air in a bag made of nylon (15 $\mu$m thick)-polyvinyl alcohol (18 $\mu$m thick)-polyethylene (60 $\mu$m thick) laminated film (space volume 40 ml) to provide a medical solution package according to the invention.

The indicating device in the package was initially purple in color but had turned yellow (normal color) by 6 hours later.

Using an injection needle (27G, Terumo, Neolus), a pinhole (about 500 $\mu$m in major diameter and about 50 $\mu$m in minor diameter) was pierced through the secondary packaging member of the above medical solution package of the invention and the change in color was monitored.

After 75 hours, the indicating device was purple and at this point of time the carbon dioxide gas fraction within the secondary package was 0.75% and the pH of the medical solution was 8.56 (the carbon dioxide gas fraction within the ampule was 18.1%).

Example 7

To the intercommunicable compartments of a two-compartment polyethylene bag (wall thickness: about 260 $\mu$m) equipped with a divider was filled with the following medical solutions, respectively, and sealed and the sealed bag was sterilized by the hot-water shower method (the pH of a mixture of the solutions after sterilization was 7.24). This bag was packed together with the pH indicating device according to Production Example 5 and a mixed gas of 10% $CO_2$-90% air in a bag (secondary 5 packaging material) made of nylon (15 $\mu$m thick)-silicon oxide-deposited polyethylene terephthalate (12 $\mu$m thick)-polyvinyl alcohol (12 $\mu$m thick)-polyethylene (60 $\mu$m thick) laminated film (space volume 400 ml) to provide a medical solution package according to the invention.

| Medical Solution Formulas | |
|---|---|
| (Compartment I) A solution containing the following components in each 300 ml | |
| Calcium chloride dihydrate | 0.17 g |
| Magnesium chloride hexahydrate | 0.22 g |
| Glucose | 0.61 g |
| (Compartment II) A solutiuon containing the following components in each 700 ml | |
| Sodium chloride | 7.15 g |
| Potassium chloride | 0.13 g |
| Sodium bicarbonate | 1.94 g |
| Potassium dihydrogen phosphate | 0.15 g |

Using an injection needle (27G, Terumo, Neolus), a pinhole (about 500 $\mu$m in major diameter and about 50 $\mu$m in minor diameter) was pierced through the secondary packaging member of the above medical solution package of the invention and the change in color was monitored.

After 24 hours, the indicating device was purple and at this point of time the carbon dioxide gas fraction within the secondary package was 0.33% and the pH of a mixture of the solutions from the two compartments was 7.38.

Example 8

To the intercommunicable compartments of a two-compartment polyethylene bag (wall thickness: about 260 $\mu$m) equipped with a divider was filled with the following medical solutions, respectively, and sealed and the sealed bag was sterilized by the hot-water shower method (the pH of a mixture of the solutions after sterilization was 7.24). This bag was packed together with the pH indicating device according to Production Example 6 and a mixed gas of 10% $CO_2$-90% air in a bag (secondary packaging member) made of nylon (15 $\mu$m thick)-polyvinyl alcohol (18 $\mu$m thick)-polyethylene (60 $\mu$m thick) laminated film (space volume 400 ml) to provide a medical solution package according to the invention.

| Medical Solution Formulas | |
|---|---|
| (Compartment I) A solution containing the following components in each 300 ml | |
| Calcium chloride dihydrate | 0.2 g |
| Magnesium sulfate heptahydrate | 0.3 g |
| Glucose (USP) | 0.8 g |
| (Compartment II) A solution containing the following components in each 700 ml | |
| Sodium chloride | 7.3 g |
| Potassium chloride | 0.3 g |
| Sodium bicarbonate | 1.9 g |
| Potassium phosphate, dibasic heptahydrate (USP) | 0.2 g |

Using an injection needle (27G, Terumo, Neolus), a pinhole (about 500 $\mu$m in major diameter and about 50 $\mu$m in minor diameter) was pierced through the secondary packaging member of the above medical solution package of the invention and the change in color was monitored.

After 18 hours, the indicating device was purple and at this point of time the carbon dioxide gas fraction within the secondary package was 0.41% and the pH of a mixture of the solutions for the two compartments was 7.36.

What is claimed is:

1. A bicarbonate-containing medicinal solution package comprising a gas-permeable plastic container holding a bicarbonate-containing medical solution and a gas-impermeable plastic packaging member containing said gas-permeable plastic container, with a carbon dioxide atmosphere established in a space between said container and packaging member and said space further containing a pH indicating device comprising a gas-permeable plastic packet containing a bicarbonate-containing fluid and a pH-indicator undergoing a change in color in response to a change in pH of said fluid.

2. The bicarbonate-containing medical solution package according to claim 1 wherein said pH-indicator is selected from the group consisting of cresol red, m-cresol purple, and phenol red.

3. The bicarbonate-containing medical solution package according to claim 1 wherein the bicarbonate of the bicarbonate-containing medical solution and/or the bicarbonate-containing fluid is sodium bicarbonate.

4. The bicarbonate-containing medical solution package according to claim 1 wherein the carbon dioxide atmosphere is established by filling the space between said container and packaging member with a carbon dioxide-generating oxygen absorber or filling said space with a mixed gas containing carbon dioxide gas.

5. The bicarbonate-containing medical solution package according to claim 1 wherein the bicarbonate-containing medical solution is a medical solution selected from the group consisting of an antidote, an artificial kidney dialysate, a peritoneal dialysate, an infusion, a dental root canal enlarging agent, an artificial cerebrospinal fluid, an intraocular irrigating solution, a cardiac perfusate, a cardioplegic solution, a peritoneal irrigating solution and a solution for organ preservation.

6. The bicarbonate-containing medical solution package according to claim 1 wherein said gas-permeable plastic container holding the bicarbonate-containing medical solution is a container comprising at least two interconnected compartments isolated from one another by a divider and the bicarbonate-containing medical solution is contained in at least one of said compartments.

7. The bicarbonate-containing medical solution package according to claim 1 wherein the gas-permeable plastic packet of said pH indicating device comprises a laminated film comprising a polypropylene outer layer and a polyethylene inner layer.

8. The bicarbonate-containing medical solution package according to claim 7 wherein the polypropylene outer layer is poly-4-methyl-1-pentene.

9. A pH indicating device comprising a gas-permeable plastic packet containing a bicarbonate-containing fluid, wherein said fluid is the medical solution in any of claims 1 through 8, and a pH-indicator having the property of undergoing a change in color in response to a change in pH of said fluid.

10. The bicarbonate-containing medical solution package according to claim 2 wherein the bicarbonate concentration of the bicarbonate-containing fluid is 0.05 to 2.0 w/v % and the pH-indicator is at a concentration of 10 to 2000 ppm.

* * * * *